(12) United States Patent
McMurray et al.

(10) Patent No.: US 7,699,526 B2
(45) Date of Patent: Apr. 20, 2010

(54) SUPPORT DAMPERS FOR BEARING ASSEMBLIES AND METHODS OF MANUFACTURE

(75) Inventors: Jeffrey W. McMurray, Phoenix, AZ (US); Mohsiul Alam, Chandler, AZ (US); Doug K. Spencer, Mesa, AZ (US); Simeon A. Ning, Stanford, AZ (US)

(73) Assignee: Honeywell International Inc., Morristown, NJ (US)

( * ) Notice: Subject to any disclaimer, the term of this patent is extended or adjusted under 35 U.S.C. 154(b) by 444 days.

(21) Appl. No.: 11/691,684

(22) Filed: Mar. 27, 2007

(65) Prior Publication Data

US 2008/0240632 A1    Oct. 2, 2008

(51) Int. Cl.
   *F16C 27/06*    (2006.01)
   *F16C 33/76*    (2006.01)
(52) U.S. Cl. .................. 384/99; 384/489; 384/536
(58) Field of Classification Search .................. 384/99, 384/105, 535–536, 581–582, 489
   See application file for complete search history.

(56) References Cited

U.S. PATENT DOCUMENTS

| | | | |
|---|---|---|---|
| 2,475,484 A | 7/1949 | De Nise | |
| 2,614,896 A * | 10/1952 | Pierce | 384/99 |
| 2,678,179 A | 5/1954 | Feeney et al. | |
| 2,955,784 A | 10/1960 | Vogel et al. | |
| 3,306,679 A * | 2/1967 | Stokely | 384/536 |
| 3,639,015 A * | 2/1972 | Maas | 384/536 |
| 3,653,625 A * | 4/1972 | Plice | 267/113 |
| 3,704,922 A * | 12/1972 | Kleinschmidt et al. | 384/582 |
| 3,743,059 A * | 7/1973 | Morse et al. | 384/536 |
| 4,069,720 A | 1/1978 | Thor | |
| 4,071,209 A | 1/1978 | Hart | |
| 4,084,861 A * | 4/1978 | Greenberg et al. | 384/99 |
| 4,722,618 A * | 2/1988 | Matsumoto et al. | 384/536 |
| 4,872,767 A * | 10/1989 | Knapp | 384/99 |
| 4,982,918 A | 1/1991 | Kaye | |
| 5,107,080 A | 4/1992 | Rosen | |
| 5,421,655 A * | 6/1995 | Ide et al. | 384/99 |
| 5,473,235 A | 12/1995 | Lance et al. | |
| 5,501,531 A * | 3/1996 | Hamaekers | 384/536 |
| 5,564,903 A * | 10/1996 | Eccles et al. | 384/535 |
| 5,603,574 A * | 2/1997 | Ide et al. | 384/119 |
| 6,224,533 B1 * | 5/2001 | Bengtsson et al. | 494/82 |
| 6,325,546 B1 * | 12/2001 | Storace | 384/536 |
| 6,644,600 B1 | 11/2003 | Olson et al. | |
| 6,682,219 B2 | 1/2004 | Alam et al. | |
| 7,488,111 B2 * | 2/2009 | Chen et al. | 384/536 |
| 2004/0137989 A1 * | 7/2004 | Nakashima | 464/32 |

* cited by examiner

*Primary Examiner*—Marcus Charles
(74) *Attorney, Agent, or Firm*—Ingrassia Fisher & Lorenz, P.C.

(57) ABSTRACT

A support damper is provided for a bearing assembly to improve the damping capabilities of an uncentered squeeze film damper and to provide a support structure stiffness to minimize rotor to structure unbalance response. In one embodiment, and by way of example only, the support damper includes an inner ring, an outer ring, and U-shaped beams. The inner ring is configured to be disposed around the bearing assembly and to extend axially along a portion thereof. The outer ring is spaced apart from the inner ring and extends radially outwardly relative thereto. The U-shaped beams couple the inner ring to the outer ring. Methods of manufacturing the support damper are also provided.

16 Claims, 4 Drawing Sheets

SUPPORT DAMPERS FOR BEARING ASSEMBLIES AND METHODS OF MANUFACTURE

TECHNICAL FIELD

The inventive subject matter relates to support dampers and, more particularly, to support dampers for use in bearing assemblies.

BACKGROUND

Gas turbine engines are used as the primary power source for many types of aircraft. Most turbine engines include rotating components such as a fan, a compressor, and a turbine. The rotating components may be clamped together either by a tieshaft or bolted flange joints to form a rotor group. Two or more bearing assemblies may be employed to support the rotor group. Generally, the bearing assemblies may be surrounded by a support housing, which may be connected to an engine case.

During high-speed rotation of the rotor group, forces may be transmitted from the rotor group to the support housing. To damp the effects of the transmitted forces, a squeeze film damper may be included in some engines. A squeeze film damper operates by supplying fluid (usually oil) through dedicated oil delivery passages into a squeeze film cavity formed via a clearance between the support housing and the bearing assemblies.

Although squeeze film dampers are relatively useful in reducing rotor vibration in some cases, they may suffer drawbacks in others. For example, because the rotor orbiting within the mount itself may become off-center with respect to the squeeze film cavity, the rotating rotor group may not remain concentric. Thus, the rotor may sit at the bottom of the damper clearance or may be unable to process around the clearance between the bearing assembly and the support housing. As a result, the squeeze film damper may become relatively stiff during operation and may not absorb as much vibration as desired. Additionally, the support housing stiffness may allow the rotor group to vibrate with certain modes when subjected to a particular engine operating speed range, and the squeeze film damper may not adequately damp this increased rotor unbalance response.

Hence, it is desirable to have an apparatus that may be used to improve the damping capabilities of an off-center squeeze film damper and provide a support structure stiffness that minimizes a rotor-to-structure unbalance response. It is desirable for the apparatus to be capable of limiting rotor radial excursion and to accommodate a particular rotor thrust load. It is also desirable for the apparatus to have a relatively compact design and to be capable of being retrofitted into existing engines.

BRIEF SUMMARY

The inventive subject matter provides a support damper for a bearing assembly and methods of manufacturing the same.

In one embodiment, and by way of example only, the support damper includes an inner ring, an outer ring, and a U-shaped beam. The inner ring is configured to be disposed around the bearing assembly and to extend axially along a portion thereof. The outer ring is spaced apart from the inner ring and extends radially outwardly relative thereto. The U-shaped beam couples the inner ring to the outer ring.

In another embodiment, and by way of example only, a bearing damper assembly includes a shaft, a bearing assembly, and a support damper. The bearing assembly is mounted to the shaft. The support damper is disposed around the bearing assembly and includes an inner ring, an outer ring, and a U-shaped beam. The inner ring is configured to be disposed around the bearing assembly and to extend axially along a portion thereof. The outer ring is spaced apart from the inner ring and extends radially outwardly relative thereto. The U-shaped beam couples the inner ring to the outer ring.

In still another embodiment, and by way of example only, a method is provided for manufacturing a support damper for disposal around a bearing assembly. The method includes forming an inner ring configured to be disposed around and to extend axially along a portion of the bearing assembly, forming an outer ring configured to extend radially outwardly relative to the inner ring, and coupling the inner ring to the outer ring with a U-shaped beam.

Other independent features and advantages of the preferred assemblies and methods will become apparent from the following detailed description, taken in conjunction with the accompanying drawings which illustrate, by way of example, the principles of the inventive subject matter.

DETAILED DESCRIPTION

The following detailed description is merely exemplary in nature and is not intended to limit the inventive subject matter or the application and uses of the inventive subject matter. Although the inventive subject matter is described as being implemented between a fan section and compressor section of a gas turbine engine, the inventive subject matter may be used with other configurations in which components are mounted to a rotor, or where the rotor may be capable of exerting an unwanted unbalance load upon a structure. Furthermore, there is no intention to be bound by any theory presented in the preceding background or the following detailed description.

Figure 1:
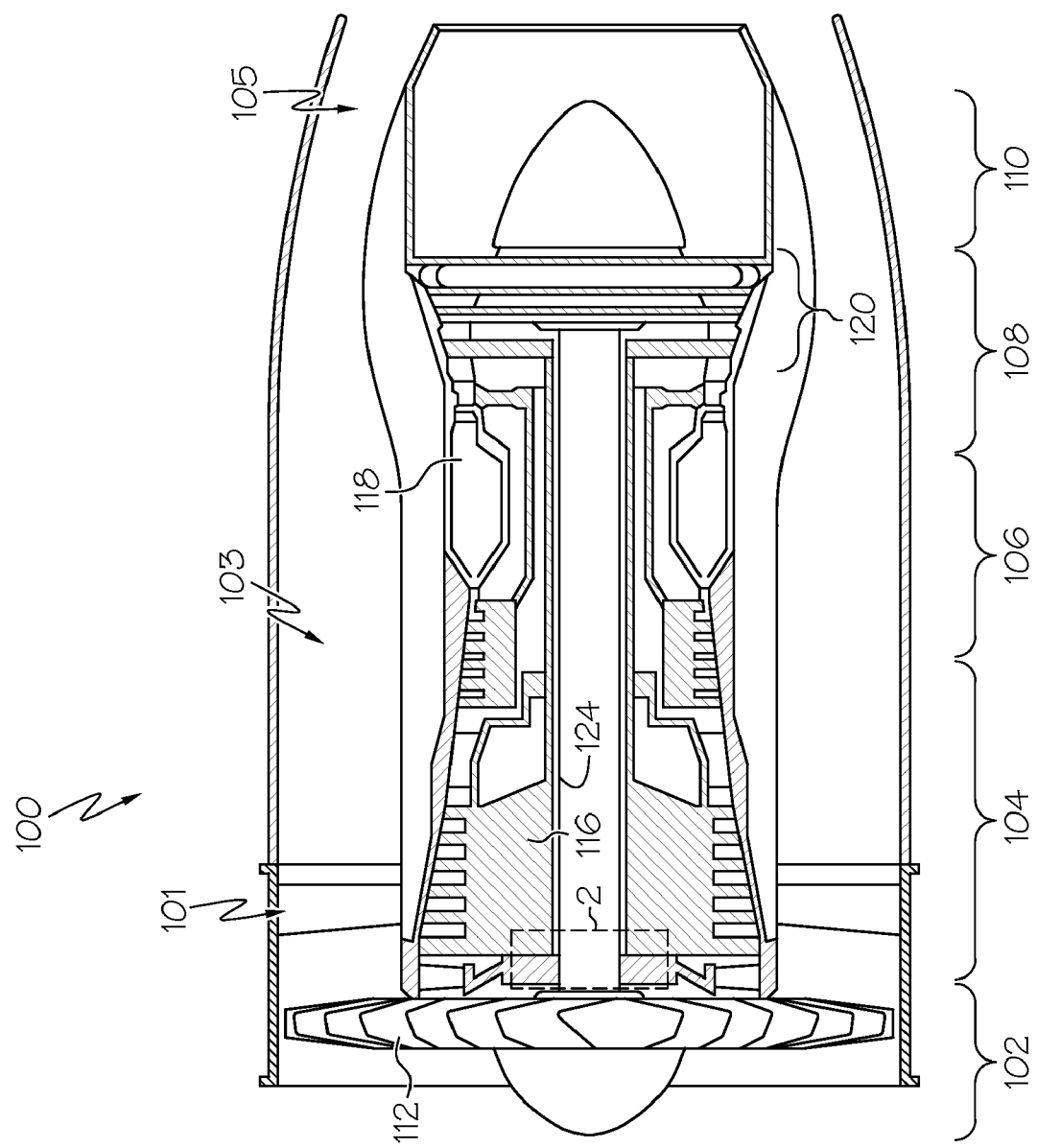
FIG. 1 is a simplified, cross-sectional view of a gas turbine engine, according to an embodiment.

FIG. 1 is a simplified, cross-sectional view of a gas turbine engine 100, according to an embodiment. The engine 100 may be disposed in an engine case 101 and may include a fan section 102, a compressor section 104, a combustion section 106, a turbine section 108, and an exhaust section 110. The fan section 102 may include a fan 112, which draws air into the fan section 102 and accelerates it. A fraction of the accelerated air exhausted from the fan 112 is directed through a bypass section 103 to provide a forward thrust. The remaining fraction of air exhausted from the fan 112 is directed into the compressor section 104.

The compressor section 104 may include series of compressors 116, which raise the pressure of the air directed into it from the fan 112. The compressors 116 may direct the compressed air into the combustion section 106. In the combustion section 106, which includes an annular combustor 118, the high pressure air is mixed with fuel and combusted. The combusted air is then directed into the turbine section 108.

The turbine section 108 may include a series of turbines 120, which may be disposed in axial flow series. The combusted air from the combustion section 106 expands through the turbines 120, causing them to rotate. The air is then exhausted through a propulsion nozzle 105 disposed in the exhaust section 110, providing additional forward thrust. In an embodiment, the turbines 120 rotate to thereby drive equipment in the engine 100 via concentrically disposed shafts or spools. Specifically, the turbines 120 may drive the compressor 116 via one or more rotors 124.

Figure 2:
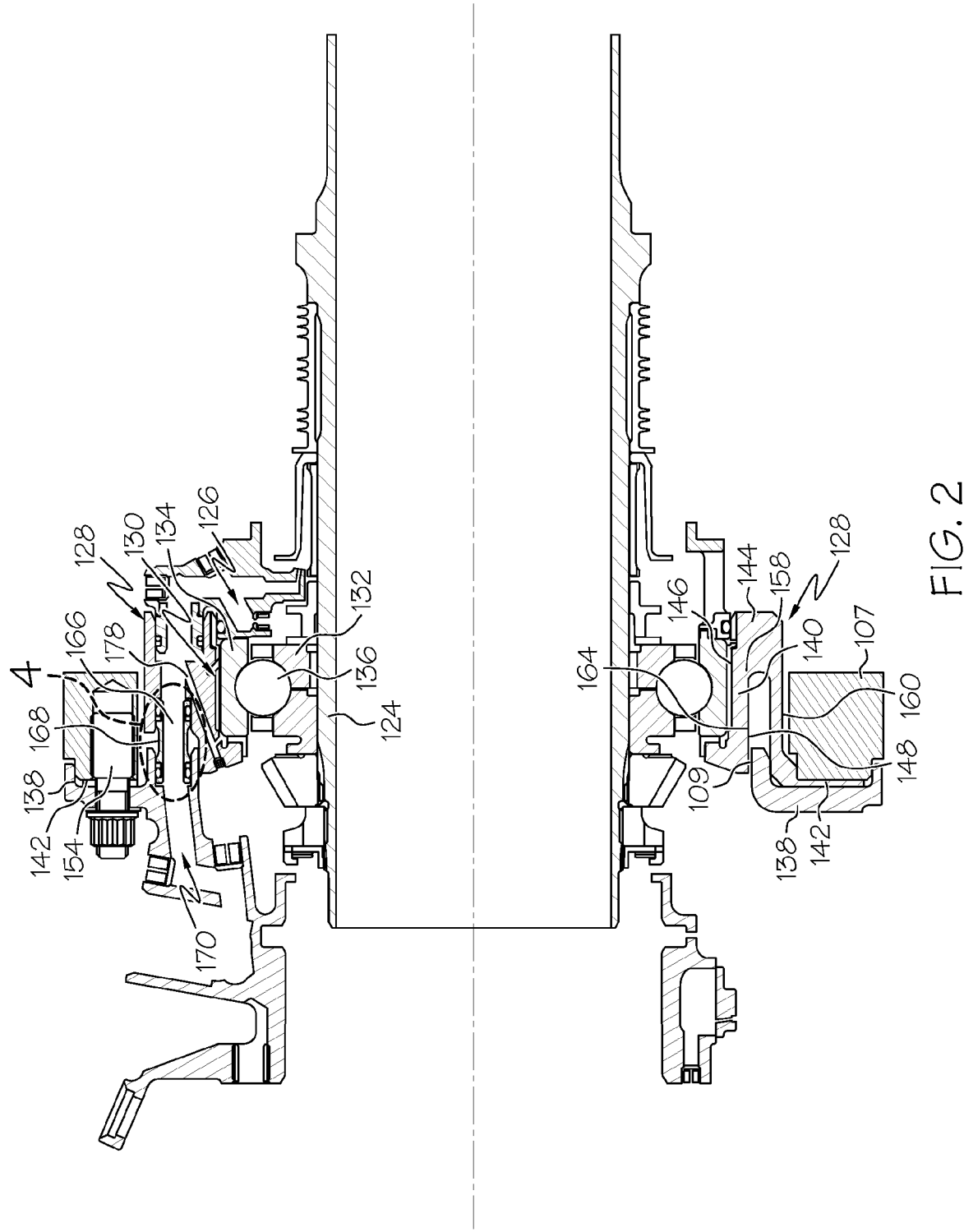
FIG. 2 is a close-up view of an area between a fan section and a compressor section of the engine indicated by a dotted line 2 shown in FIG. 1 in which a support damper is implemented, according to an embodiment.

Turning now to FIG. 2, a close-up view of an area between the fan section 102 and the compressor section 104 indicated by a dotted line 2 shown in FIG. 1 is provided, according to an embodiment. A bearing assembly 126, support damper 128, and squeeze film damper 130 are included to reduce vibration that may occur when the rotors 124 rotate. The bearing assembly 126 is disposed around a portion of the rotor 124 and maintains the rotor 124 in a desired position during rotation. The bearing assembly 126 includes an inner race 132, an outer race 134, and a conventional rolling element 136, such as a ball or roller, disposed therebetween. The inner race 132 is mounted to the rotor 124.

Figure 3:
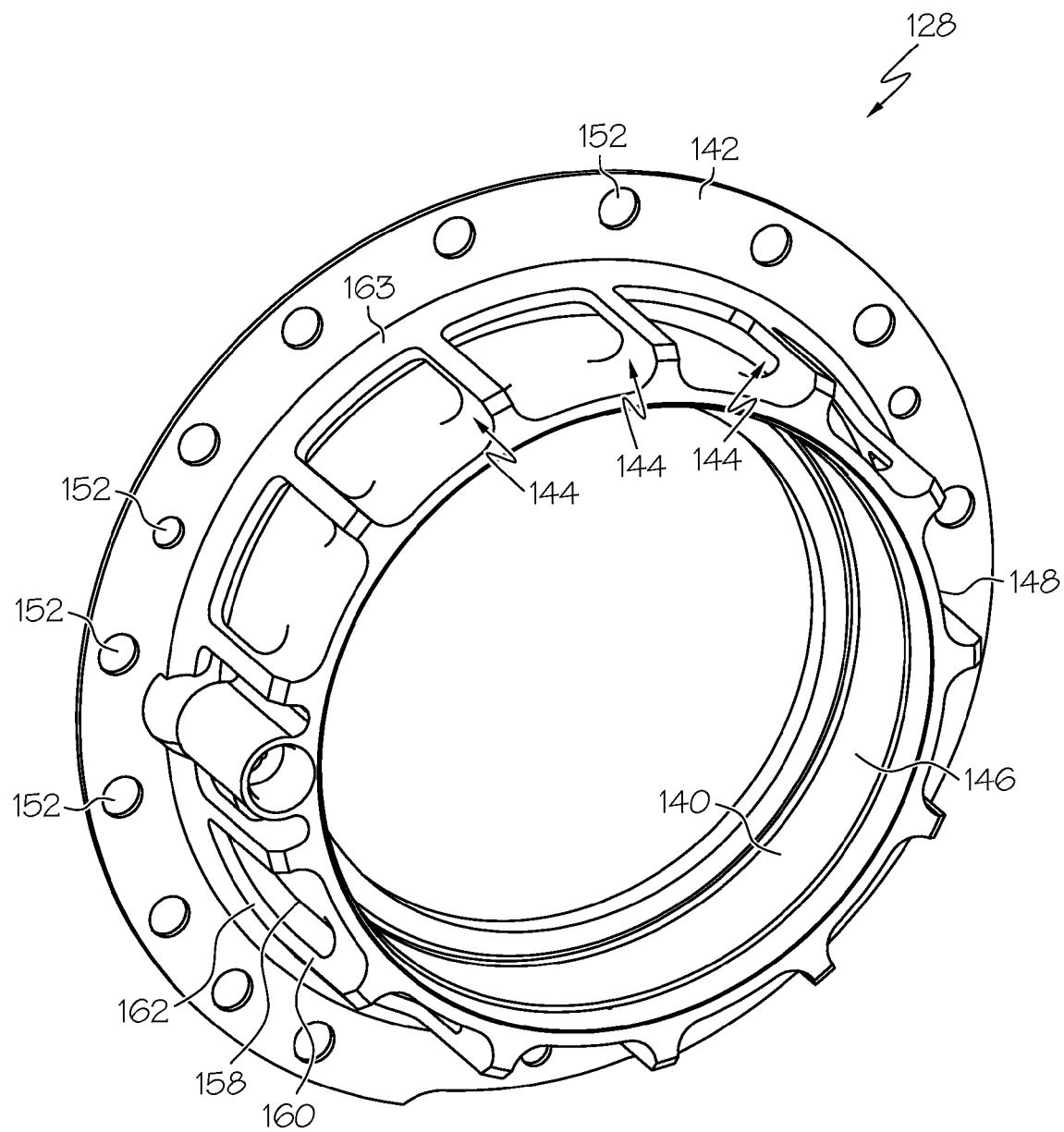
FIG. 3 is a perspective view of a support damper, according to an embodiment.

The support damper 128 is configured to form a portion of the squeeze film damper 130 and is mounted to an annular support housing 138 (only a portion of which is shown). Referring also to FIG. 3, which is a perspective view of the support damper 128, according to an embodiment, an inner ring 140, an outer ring 142, and a plurality of U-shaped beams 144 are included. The inner ring 140 extends axially along a portion of the bearing assembly 126 and includes an inner annular surface 146 and an outer annular surface 148. In an embodiment, the inner annular surface 146 has a diameter that is sufficient to accommodate the bearing assembly 126, the rotor 124, and the squeeze film damper 130. In another embodiment, the diameter of the inner annular surface 146 may also be sufficient to form a gap between the support damper 128 and the bearing assembly outer race 134 that forms the squeeze film damper 130. In yet another embodiment, the inner annular surface 146 may be formed to compensate for off-center characteristics that may exist in the surrounding components. For example, the rotor 124 may be off-center relative to the support damper 128, and the inner annular surface 146 may be formed such that its center may not be coincident with the center of the outer annular surface 148. Alternatively, the inner annular surface 146 of the support damper 128 or inner diameter of the support housing 138 with the engine structure 107 may be formed to compensate for off-center characteristics that may exist in the surrounding components.

The outer ring 142 is configured to mount the support damper 128 to the support housing 138. In this regard, the outer ring 142 extends radially outward relative to the inner ring 140 and includes bolt openings 152 that accommodate bolts 154 therein. In an embodiment, the outer ring 142 has an inner diameter that may be greater than an outer diameter of the inner ring 140.

To provide flexibility to the support damper 128, U-shaped beams 144 couple the inner and outer rings 140, 142 to each other. Each beam 144 may include a first arm 158 and a second arm 160. In an embodiment, the first arm 158 extends along a portion of the inner ring outer annular surface 148, and the second arm 160 includes an end 162 coupled to the outer ring 142. Although the second arm ends 162 are shown as being integrally formed with an attachment ring 163, which may be directly coupled to or formed with the outer ring 142, the second arm ends 162 may alternatively be directly coupled to or formed with the outer ring 142. Additionally, although the second arm 160 is shown in FIG. 3 as being disposed substantially perpendicular relative to the outer ring 142, in another embodiment, it may not be.

To limit radial displacement of the rotor 124, the U-shaped beams 144 may be configured to maintain the inner and outer rings 140, 142 a predetermined distance apart from each other. In an embodiment, the inner ring outer annular surface 148 forms a controlled clearance 109 with the support housing 138 to limit rotor radial displacement. In another embodiment, an axially extending section 164 of the support damper 128 may be used as a stop, and thus, the inner and outer rings 140, 142 are held a sufficient distance apart to at least accommodate the thickness of the axially extending section 164. In still another embodiment, the U-shaped beam 144 may be configured to maintain the inner and outer rings 140, 142 a sufficient distance apart such that the axially extending section 164 contacts the outer ring 142 without contacting the inner ring 140.

As mentioned briefly above, one or more U-shaped beams 144 may make up a portion of the support damper 128. In an embodiment in which more than one U-shaped beam 144 is included, the beams 144 may be symmetrically disposed around the inner and outer rings 140, 142 to thereby minimize rotor 124 excursion due to bearing thrust. In another embodiment, the U-shaped beam 144 may be asymmetrically disposed around the inner and outer rings 140, 142. It will be appreciated that the particular length of the beam arms 158, 160, the particular cross-section shape of the beams 144, and the particular number of beams 144 employed may be varied, depending on a magnitude of excursion and vibration to which the rotor 124 may be subjected or the desired structural stiffness of the support damper 128.

Figure 4:
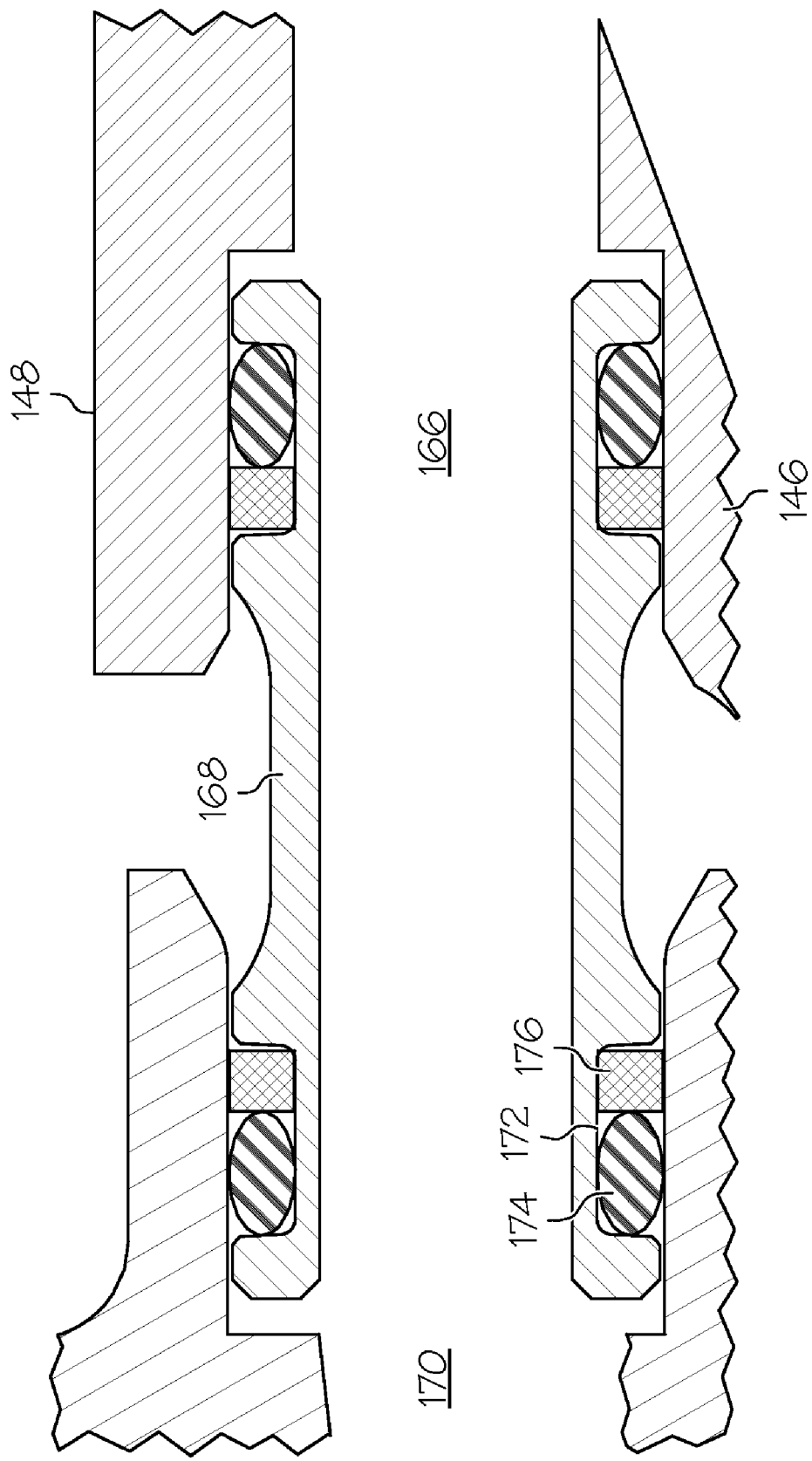
FIG. 4 is a close-up view of an area of the engine indicated by a dotted line 4 shown in FIG. 2 of a transfer passage and transfer tube, according to an embodiment.

In another embodiment, the support damper 128 may be configured to provide a path along which fluid may flow to the bearing assembly 126 and the squeeze film damper 130. In this regard, the support damper 128 may include a transfer passage 166 formed therein that is configured to accommodate a transfer tube 168 that may be used to provide communication between the transfer passage 166 and a fluid source passageway 170. Referring also to FIG. 4, which illustrates a close up view of an area indicated by a dotted line 4 shown in FIG. 2, in an embodiment, the transfer passage 166 may be formed between the inner ring inner and outer annular surfaces 146, 148 and disposed between two of the U-shaped beams 144. In another embodiment, the transfer passage 166 may be a separately formed component that may be attached to the inner ring outer annular surface 148. The transfer tube 168 is configured such that a first portion may be disposed within the transfer passage 166 and a second portion maybe disposed within the fluid source passageway 170. In still another embodiment, the inner ring 140 may include an oil supply line 178 formed between the inner ring inner and outer annular surfaces 146, 148 to allow fluid to flow to the squeeze film damper 130.

To prevent fluid from leaking through any gap that may exist between the transfer tube 168 and the transfer passage 166 and fluid source passageway 170, at least one groove 172 may be formed on an outer surface of the transfer tube 168, and an O-ring 174 and polytetrafluoroethylene ring 176 may be disposed in the groove 172. The O-ring 174 may be any conventionally known O-ring. The polytetrafluoroethylene ring 176 may have a square cross-section to enhance sealing.

Regarding methods of manufacturing the support damper 128, each component thereof may be integrally formed, or alternatively each component may be separately formed and subsequently bonded, or otherwise attached together. In either case, an inner ring configured to be disposed around and to extend axially along a portion of the bearing assembly 126 is formed. An outer ring configured to be spaced apart from the inner ring and to extend radially outwardly relative thereto is also formed. The inner ring is then coupled to the outer ring with one or more U-shaped beams. The U-shaped beams may be symmetrically or asymmetrically disposed around the rings. In another embodiment, a transfer passage may be formed between an inner ring inner surface and the inner ring outer surface.

During operation of the engine 100, fluid flows through the fluid source passageway 170, into the transfer tube 168, and through the transfer passage 166. A portion of the fluid may be directed into the squeeze film damper oil supply line 178 and towards a cavity within which the bearing assembly 126 is disposed. Fluid may then enter the squeeze film damper 130 to absorb vibration that may result from rotor 124 rotation. The support damper 128 also absorbs vibration from the rotor 124 and acts as a spring support when radial or axial movement of the rotor 124 occurs and provides a support structure stiffness to minimize rotor to structure unbalance response.

Apparatus have now been provided to improve the damping capabilities of an uncentered squeeze film damper and provide a support structure stiffness to minimize rotor to structure unbalance response. The apparatus may limit rotor excursion and accommodate rotor thrust loads. Additionally, the apparatus may be relatively compact in design and may be retrofitted into existing engines While the inventive subject matter has been described with reference to a preferred embodiment, it will be understood by those skilled in the art that various changes may be made and equivalents may be substituted for elements thereof without departing from the scope of the inventive subject matter. In addition, many modifications may be made to adapt to a particular situation or material to the teachings of the inventive subject matter without departing from the essential scope thereof. Therefore, it is intended that the inventive subject matter not be limited to the particular embodiment disclosed as the best mode contemplated for carrying out this inventive subject matter, but that the inventive subject matter will include all embodiments falling within the scope of the appended claims.

We claim:

1. A support damper for a bearing assembly, the support damper comprising:
    an inner ring configured to be disposed around the bearing assembly and to extend axially along a portion thereof, the inner ring having an inner annular surface, an outer annular surface, and a transfer passage formed between the inner annular surface and the outer annular surface;
    an outer ring spaced apart from the inner ring and extending radially outwardly relative thereto;
    a U-shaped beam coupling the inner ring to the outer ring; and
    a transfer tube disposed at least partially within the transfer passage.

2. The support damper of claim 1, further comprising a plurality of U-shaped beams coupling the inner ring to the outer ring.

3. The support damper of claim 2, wherein the plurality of U-shaped beams is disposed symmetrically around the inner ring and the outer ring.

4. The support damper of claim 1, wherein:
    the U-shaped beam has a first arm and a second arm, the first arm extending along a portion of the inner ring outer annular surface, and the second arm including an end coupled to the outer ring.

5. The support damper of claim 1, further comprising:
    an O-ring disposed within the transfer passage and mounted to the transfer tube; and
    a polytetrafluoroethylene ring disposed within the transfer passage and mounted to the transfer tube adjacent the O-ring.

6. The support damper of claim 5, wherein the polytetrafluoroethylene ring has a square-shaped cross section.

7. The support damper of claim 1, wherein the inner ring, the outer ring, and the U-shaped beam are integrally formed.

8. A bearing damper assembly comprising:
    a shaft;
    a bearing assembly mounted to the shaft; and
    a support damper disposed around the bearing assembly, the support damper including:
        an inner ring configured to be disposed around the bearing assembly and to extend axially along a portion thereof, the inner ring having an inner annular surface, an outer annular surface, and a transfer passage formed between the inner annular surface and the outer annular surface;
        an outer ring spaced apart from the inner ring and extending radially outwardly relative thereto;
        a U-shaped beam coupling the inner ring to the outer ring; and
        a transfer tube disposed at least partially within the transfer passage.

9. The bearing damper assembly of claim 8, further comprising a plurality of U-shaped beams coupling the inner ring to the outer ring.

10. The bearing damper assembly of claim 8, wherein:
    the U-shaped beam has a first arm and a second arm, the first arm extending along a portion of the inner ring outer annular surface, and the second arm including an end coupled to the outer ring.

11. The bearing damper assembly of claim 8, further comprising:
    an annular support housing disposed around the support damper, the annular support housing including an axially extending section disposed between the inner ring and the outer ring.

12. The bearing damper assembly of claim 8, further comprising:
    an O-ring disposed within the transfer passage and mounted to the transfer tube; and
    a polytetrafluoroethylene ring disposed within the transfer passage and mounted to the transfer tube adjacent the O-ring.

13. A method of manufacturing a support damper for disposal around a bearing assembly, the method comprising the steps of:

forming an inner ring configured to be disposed around and to extend axially along a portion of the bearing assembly, the inner ring having an inner annular surface, an outer annular surface, and a transfer passage formed between the inner annular surface and the outer annular surface;

forming an outer ring configured to extend radially outwardly relative to the inner ring;

coupling the inner ring to the outer ring with a U-shaped beam; and disposing a transfer tube at least partially within the transfer passage.

14. The method of claim 13, further comprising integrally forming the inner ring, the outer ring, and the U-shaped beam.

15. The method of claim 13, wherein the step of coupling the inner ring comprises coupling the inner ring to the outer ring with a plurality of U-shaped beams.

16. The method of claim 15, wherein the step of coupling comprises disposing the plurality of U-shaped beams symmetrically around the inner ring and the outer ring.

* * * * *